United States Patent [19]

Bach et al.

[11] Patent Number: 4,769,990
[45] Date of Patent: Sep. 13, 1988

[54] COMBINATION ACCUMULATOR AND VARIABLE VOLUME SUMP

[75] Inventors: Lloyd G. Bach, South Bend, Ind.; George E. Brown, Niles, Mich.

[73] Assignee: Allied Signal Inc., Morristown, N.J.

[21] Appl. No.: 66,287

[22] Filed: Jun. 25, 1987

[51] Int. Cl.[4] ............................................. F16L 55/04
[52] U.S. Cl. ........................................ 60/416; 60/582; 138/31
[58] Field of Search .................. 60/582, 413, 416, 417; 138/30, 31

[56] References Cited

U.S. PATENT DOCUMENTS

| | | | |
|---|---|---|---|
| 2,968,320 | 1/1961 | Gratzmuller | 138/31 |
| 3,863,676 | 2/1975 | Tarsha | 138/31 |
| 3,898,808 | 8/1975 | Ewald et al. | 60/582 X |
| 4,138,846 | 2/1979 | Sakakibara | 60/413 X |
| 4,351,357 | 9/1982 | Orme | 60/413 X |
| 4,471,806 | 9/1984 | Strock | 60/413 X |
| 4,651,782 | 3/1987 | Fulmer | 138/31 |
| 4,685,491 | 8/1987 | Fulmer et al. | 138/31 |

FOREIGN PATENT DOCUMENTS 248467 12/1985 Japan .

Primary Examiner—Robert E. Garrett
Assistant Examiner—George Kapsalas
Attorney, Agent, or Firm—Larry J. Palguta; Ken C. Decker

[57] ABSTRACT

The combination accumulator and variable volume sump (50) comprises a housing (52) having therein a stepped bore (56). An H-shaped piston and a U-shaped piston (60, 80) are diaposed within the stepped bore (56), the first piston comprising an accumulator piston (60) and defining with the housing (52) and stepped bore (56) a first chamber (70) containing therein pressurized medium. The second piston (80) defines with the housing (52) and stepped bore (56) a second chamber (90) containing therein pressurized fluid. Open ends of the U-shaped pistons (60, 80) are received one within another, and a spring (95) is disposed between interior openings (62, 82) of pistons (60, 80) to bias them apart. The housing (52) has a pair of openings (54, 59) for communicating pressurized fluid, one opening (54) communicating with the second chamber (90) and the other opening (59) communicating with the stepped bore (56) in order to communicate pressurized fluid to the first piston (60). Displacement of the first piston (60) along the stepped bore (56) results in a corresponding increased displacement of the second piston (80) relative to the housing (52).

24 Claims, 1 Drawing Sheet

COMBINATION ACCUMULATOR AND VARIABLE VOLUME SUMP

BACKGROUND OF THE INVENTION

This invention relates generally to a combination accumulator and variable volume sump, in particular an accumulator and sump utilized in a vehicle anti-lock brake system.

A vehicle anti-lock brake system may include a pump for transmitting pressurized fluid throughout the system, including the displacement of fluid into an accumulator and the removal of fluid from a sump. The sump is present in the system in order to provide a mechanism which will quickly absorb fluid being displaced from the brakes during a decay function. The fluid is displaced through line connections and into the sump, and then the pump is actuated shortly thereafter to draw fluid from the sump and transmit the fluid into the system which includes an accumulator where pressurized fluid may be stored. If a large amount of fluid has been displaced through the brake system to the brakes, such as occurs during a high-pressure "spike" application of the brakes, during the decay function the fluid in the brakes is displaced to the sump which will absorb a predetermined amount of fluid volume established by failure mode considerations. The remaining excess amount of fluid from the brakes must be pumped into the accumulator to permit complete release of the brake pressure. The accumulator has a gas precharge pressure which is substantially higher than normal braking pressure. In order to reduce rapidly the fluid braking pressure, the pump must displace a considerable amount of fluid. For a large volume fluid flow to be effected by the pump at the high precharge pressure of the accumulator, the pump motor requires a substantial amount of horse power and a correspondingly large electric current requirement. It would be desirable to provide a sump displacement which could absorb the excess amount of fluid displaced during the decay function so that the pump need not displace the excess fluid volume to the accumulator, and thus utilize a much smaller pump. It is also highly desirable that in the event of some failures, such as failure of the pump, that the sump absorb a small volume of fluid so that only a modest portion of available master cylinder fluid displacement will be "lost" into the sump.

SUMMARY OF THE INVENTION

The invention comprises a combination accumulator and variable volume sump comprising a housing having therein a stepped bore, a first piston disposed within said stepped bore, one end of the first piston and one end of the housing defining with the bore a first chamber having a pressurized medium therein, a second piston disposed in the bore and having a first end and the other end of the housing defining with the bore a second chamber having pressurized fluid therein, the second piston having a first end received within an opening disposed in the first piston, resilient means disposed between said pistons biasing the pistons apart, the housing having an inlet opening at the other end of the housing to permit pressurized fluid to communicate with the second chamber, the second piston displaced into the first piston by the pressurized fluid, and the housing having another opening permitting fluid to be communicated therethrough and communicate with the stepped bore and the other end of the first piston in order to displace the first piston within the stepped bore, so that displacement of the first piston along said stepped bore permits a corresponding additional amount of displacement of the second piston relative to the housing.

BRIEF DESCRIPTION OF THE DRAWING

One way of carrying out the invention is described in detail below with reference to the drawings which illustrate an embodiment, in which.

DESCRIPTION OF THE PREFERRED EMBODIMENT

Figure 1:
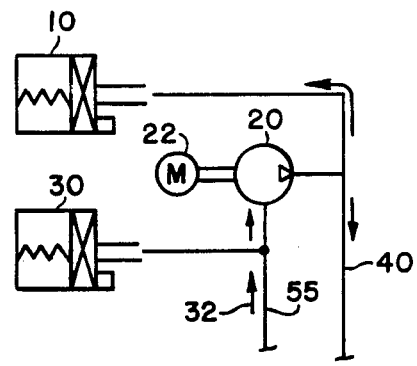
FIG. 1 is a schematic representation of an accumulator, pump, and sump in an anti-skid mechanism.

FIG. 1 illustrates schematically the accumulator 10, pump 20, and sump 30 utilized in a vehicle anti-lock brake system. Pressurized fluid received from the brakes flows in the direction of arrow 32 through line connection or passage 55 and is absorbed by sump 30 during the decay function of the anti-lock brake system. The motor 22 activates the pump 20 which pumps pressurized fluid to the accumulator 10 and also to the system via line connection or passage 40. Line connections 55 and 40 are usually controlled by solenoid valves operated by command signals from the anti-lock computer. The sump volume is typically 30% or less of master cylinder fluid displacement in order to maximize system failure protection. During a high pressure "spike" application of the brakes, brake absorption of fluid can be of considerable magnitude. In order to decay the brake fluid pressure below a desired predetermined pressure level, the sump must be able to absorb a predetermined amount of fluid and the remaining fluid from the brakes must be pumped into accumulator 10 which has a precharge pressure higher than the normal braking pressure. In order to reduce rapidly or decay the brake fluid pressure, the pump flow must comprise a relatively high rate of flow. Thus, high volume fluid flow by the pump at the precharge pressure of the accumulator requires a large horsepower motor 22 and a correspondingly high electric current usage. However, even with a reasonably high pump flow, the risk of saturating a small size sump is high and that is detrimental to the rate of decay of braking pressure. A typical anti-lock brake system may include two or more similar circuits.

Figure 2:
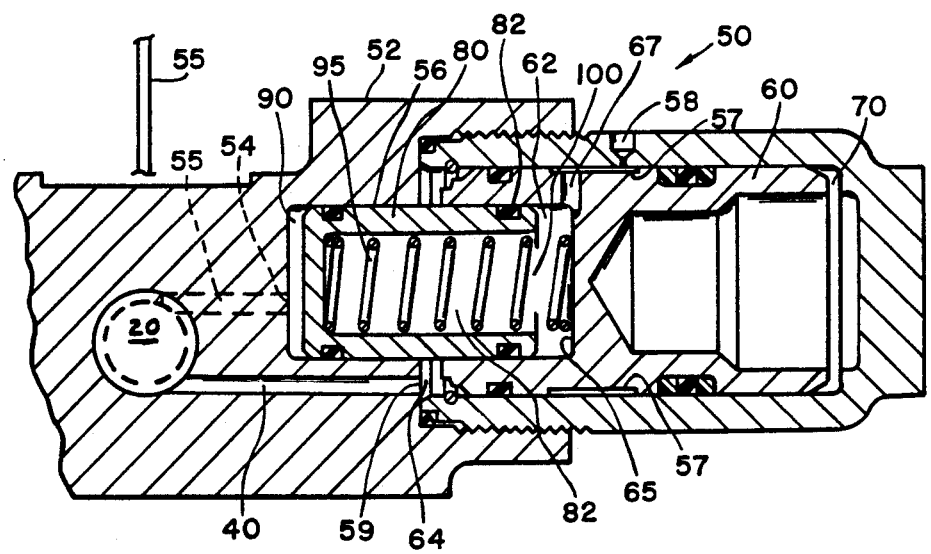
FIG. 2 is a schematic section view of the combination accumulator and variable volume sump.

The present invention combines together the accumulator and sump so that the sump volume is a constant predetermined amount plus a proportional displaced volume effected by the accumulator piston. Referring to FIG. 2, the combination accumulator and variable volume sump is designated generally by reference numeral 50. The combination 50 includes a housing 52 having an opening (not shown) for receiving pressurized medium such as nitrogen, and another housing opening 54 receives pressurized fluid via line connection 55. Disposed within housing 52 is a stepped bore 56 containing a H-shaped accumulator piston 60 and a U-shaped sump piston 80. Accumulator piston 60, stepped bore 56, and housing 52 define a first chamber 70 which contains the pressurized medium. Piston 60, stepped bore 56, and the outer surface of sump piston 80 define an accumulator chamber 64. Sump piston 80, stepped bore 56, and housing 52 define a second chamber 90 containing pressurized fluid. Accumulator piston 60 includes an interior opening 62 and sump piston 80 includes an interior opening 82, the openings defining between them variable volume third chamber 100. Piston 80 has a seal 82 engaging sealingly the interior of piston 60. Pistons 60, 80 define therebetween the third chamber 100 having therein a spring or resilient mechanism 95. Accumulator piston 60 includes a reduced diameter section 57 communicating with a housing vent 58 that communicates with atmosphere and with third chamber 100 via opening 67 in piston 60. Housing 52 also includes an opening 59 which communicates accumulator chamber 64 with passage 40. The pump 20 provides fluid to passage 40 which communicates the pressurized fluid to chamber 64 in order to displace accumulator piston 60. The pump draws fluid from second chamber 90 via passage 55 which also communicates with the braking system. As sump piston 80 is displaced relative to accumulator piston 60, the medium (typically atmosphere) in chamber 100 is displaced via piston opening 67, reduced diameter section 57, and vent 58. The displacement volume of chamber 90 (the sump volume) is a constant amount determined by the amount of displacement of sump piston 80 relative to accumulator piston 60 while accumulator piston 60 is in an at rest position wherein piston 80 may be displaced a predetermined distance until it engages the accumulator interior opening surface 65 in chamber 100. However, the sump volume may be increased by the displacement of accumulator piston 60. Thus, pump 20 need displace significantly less fluid volume than required in previous designs because as accumulator piston 60 is displaced so that the accumulator absorbs fluid, sump piston 80 may be displaced a corresponding additional distance to enable chamber 90 to absorb a proportional amount of fluid in addition to the constant minimum volume. The result is an increased pressure reduction rate for a specified size pump displacement, which results in the utilization of a smaller pump. When the pump has displaced enough fluid into the accumulator to reduce sump pressure below a predetermined pressure established by sump spring 95, piston 80 will travel to the left in FIG. 2 and toward a nondisplaced position.

The present invention provides a variable volume sump having an initial predetermined minimum volume plus a volume corresponding to the amount of displacement of the accumulator piston. The sump and accumulator may be contained in a single package as a cartridge, and the increase in the size of the sump chamber capacity allows utilization of a smaller pump. An important advantage provided by the present invention is the enhancement of failure mode operation wherein failure of the pump results in the sump piston displacement being limited to the predetermined minimum amount so that only a modest portion of available master cylinder fluid displacement will be "lost" into the sump.

Various modifications of the above-described embodiment of the invention will be apparent to those skilled in the art. It is to be understood that such modifications can be made without departing from the scope of the invention.

We claim:

1. A combination accumulator and variable volume sump, comprising a housing having therein a stepped bore, a first piston disposed within said stepped bore, one end of the first piston and one end of the housing defining with the bore a first chamber having therein a pressurized medium, a second piston disposed in the bore and having a first end and a second end of the housing defining with the bore a second chamber having therein pressurized fluid, the second piston having a second end received within an interior opening in the first piston, resilient means disposed between said pistons and biasing apart the pistons, the housing having a first opening at the second end of the housing to permit pressurized fluid to communicate with the second chamber, the second piston displaced into the first piston by the pressurized fluid, and the housing having a second opening permitting fluid to be communicated with the stepped bore and a second end of the first piston in order to displace the first piston within the stepped bore, so that displacement of the first piston along said stepped bore permits a corresponding additional amount of displacement of the second piston relative to the housing.

2. The combination accumulator and variable volume sump in accordance with claim 1, wherein the first piston includes a reduced diameter section communicating with a third opening in the housing, the first piston having a radial opening communicating the interior opening with the reduced diameter section so that displacement of the pistons relative to one another causes a medium to be communicated between the interior opening of the first piston and the third opening.

3. The combination accumulator and variable volume sump in accordance with claim 2, wherein the second piston comprises a U-shaped piston so that the second end of the second piston is open and received within the interior opening of the first piston to define therebetween a third chamber.

4. The combination accumulator and variable volume sump in accordance with claim 3, wherein the first piston includes a pair of seals located at opposite ends of the first piston, the reduced diameter section disposed between the seals.

5. The combination accumulator and variable volume sump in accordance with claim 4, wherein the second piston includes a seal disposed about the second end thereof, the seal engaging the second end of the first piston to provide sealing therebetween.

6. The combination accumulator and variable volume sump in accordance with claim 5, wherein the second piston has a seal disposed about the first end thereof, the seal engaging the stepped bore in order to provide sealing therebetween.

7. The combination accumulator and variable volume sump in accordance with claim 6, further comprising a pump and line connections, and the pump receiving fluid from one line connection which communicates with the first opening and second chamber containing pressurized fluid, the pump displacing pressurized fluid through a second line connection to the second opening of the housing.

8. The combination accumulator and variable volume sump in accordance with claim 1, wherein the first piston comprises a generally H-shaped piston and the second piston comprises a generally U-shaped piston, the second end of the second piston being open and received within the interior opening of the first piston to define therebetween a variable volume chamber.

9. A combination accumulator and variable volume sump, comprising a housing having therein a stepped bore, a first piston disposed within said stepped bore, one end of the first piston and one end of the housing defining with the bore a first chamber having therein a pressurized medium, characterized in that a second piston is disposed in the bore and has a first end and a second end of the housing defining with the bore a second chamber having therein pressurized fluid, the second piston having a second end received within an interior opening in the first piston, resilient means disposed between said pistons and biasing apart the pistons, the housing having a first opening at the second end of the housing to permit pressurized fluid to communicate with the second chamber, the second piston displaced into the first piston by the pressurized fluid, and the housing having a second opening permitting fluid to be communicated with the stepped bore and a second end of the first piston in order to displace the first piston within the stepped bore, so that displacement of the first piston along said stepped bore permits a corresponding additional amount of displacement of the second piston relative to the housing.

10. The combination accumulator and variable volume sump in accordance with claim 9, characterized in that the first piston includes a reduced diameter section communicating with a third opening in the housing, the first piston having a radial opening communicating the interior opening with the reduced diameter section so that displacement of the pistons relative to one another causes a medium to be communicated between the interior opening of the first piston and the third opening.

11. The combination accumulator and variable volume sump in accordance with claim 10, characterized in that the first piston includes a pair of seals located at opposite ends of the first piston, the reduced diameter section disposed between the seals.

12. The combination accumulator and variable volume sump in accordance with claim 9, characterized in that the second piston comprises a generally U-shaped piston so that the second end of the second piston is open and received within the interior opening of the first piston to define therebetween a third chamber.

13. The combination accumulator and variable volume sump in accordance with claim 9, characterized in that the second piston includes a seal disposed about the second end thereof, the seal engaging the second end of the first piston to provide sealing therebetween.

14. The combination accumulator and variable volume sump in accordance with claim 9, characterized in that the second piston has a seal disposed about the first end thereof, the seal engaging the stepped bore in order to provide sealing therebetween.

15. The combination accumulator and variable volume sump in accordance with claim 9, characterized in that the combination further comprises a pump and line connections, and the pump receiving fluid from one line connection which communicates with the first opening and second chamber containing pressurized fluid, the pump displacing pressurized fluid through a second line connection to the second opening of the housing.

16. The combination accumulator and variable volume sump in accordance with claim 9, wherein the first piston comprises a generally H-shaped piston and the second piston comprises a generally U-shaped piston, the second end of the second piston being open and received within the interior opening of the first piston to define therebetween a variable volume chamber.

17. A combination accumulator and variable volume sump, comprising a housing having therein a stepped bore, a first piston disposed within said stepped bore, one end of the first piston and one end of the housing defining with the bore a first chamber having therein a pressurized medium, a second piston disposed in the bore and having a first end and a second end of the housing defining with the bore a second chamber having therein pressurized fluid, the second piston having a second end received at a second end of the first piston, resilient means disposed between said pistons and biasing apart the pistons, the housing having a first opening at the second end of the housing to permit pressurized fluid to communicate with the second chamber, the second piston displaced toward the first piston by the pressurized fluid, the housing having a second opening permitting fluid to be communicated with the stepped bore and a second end of the first piston in order to displace the first piston within the stepped bore, so that displacement of the first piston along said stepped bore permits a corresponding additional amount of displacement of the second piston relative to the housing, and the housing including an atmospheric pressure communication path communicating with an area between said first and second pistons so that displacement of the pistons relative to one another permits atmospheric pressure to be communicated between said area and communication path.

18. The combination accumulator and variable volume sump in accordance with claim 17, wherein one of said first and second pistons includes an interior opening, and a piston of said first and second pistons is received slidably within the interior opening.

19. The combination accumulator and variable volume sump in accordance with claim 18, wherein the pistons include a seal therebetween sealingly and slidably engaging a surface of the interior opening.

20. The combination accumulator and variable volume sump in accordance with claim 17, wherein the resilient means biases said second piston toward said second chamber.

21. The combination accumulator and variable volume sump in accordance with claim 17, wherein the housing comprises first and second housing parts coupled together, the first housing part receiving slidably the first piston and the second housing part receiving slidably the second piston.

22. The combination accumulator and variable volume sump in accordance with claim 21, wherein the resilient means extends across a transverse interface defined by the termination of a first end of the first housing part within the second housing part.

23. The combination accumulator and variable volume sump in accordance with claim 17, wherein the second ends of the pistons may abut one another when the resilient means is compressed.

24. The combination accumulator and variable volume sump in accordance with claim 23, wherein the resilient means consists of a coiled spring extending between the pistons.

* * * * *